Sept. 25, 1945.　　　L. T. FREEMAN ET AL　　　2,385,622
BRAKE OPERATING MECHANISM
Filed Sept. 9, 1943　　　2 Sheets-Sheet 1

INVENTORS
LEON T. FREEMAN
ROY H. SHIVELY
BY
Emery, Varney, Whittemore &c.
ATTORNEYS Sept. 25, 1945.  L. T. FREEMAN ET AL  2,385,622
BRAKE OPERATING MECHANISM
Filed Sept. 9, 1943  2 Sheets-Sheet 2

INVENTORS
LEON T. FREEMAN
ROY H. SHIVELY
BY
Emery, Varney, Whittemore & Dix
ATTORNEYS Patented Sept. 25, 1945

2,385,622

UNITED STATES PATENT OFFICE 2,385,622

BRAKE OPERATING MECHANISM

Leon T. Freeman and Roy H. Shively, Scranton, Pa.; said Freeman assignor to said Shively Application September 9, 1943, Serial No. 501,612

7 Claims. (Cl. 188—196)

This invention relates to brake operating mechanism and has for an object the provision of improvements in this art.

One of the particular objects of the invention is to provide a light weight, sturdy, inexpensive and dependable device for automatically maintaining brakes in properly adjusted position.

Another object is to provide a brake adjuster in which the outer casing moves with the cam shaft operating arm and occupies only a small space around the cam shaft.

Another object is to provide automatic brake adjusting means which can be readily substituted for standard manually adjusted brake operating means and the reverse.

Another object is to provide brake operating means which is readily reversible so that it may be applied to either right hand or left hand equipment.

Another object is to provide improved details of construction.

The above and other objects of the invention will be apparent from the following description of exemplary embodiment of the invention, reference being made to the accompanying drawings, wherein:

Fig. 7 is a flat view of an operating pawl; and

Figure 1:
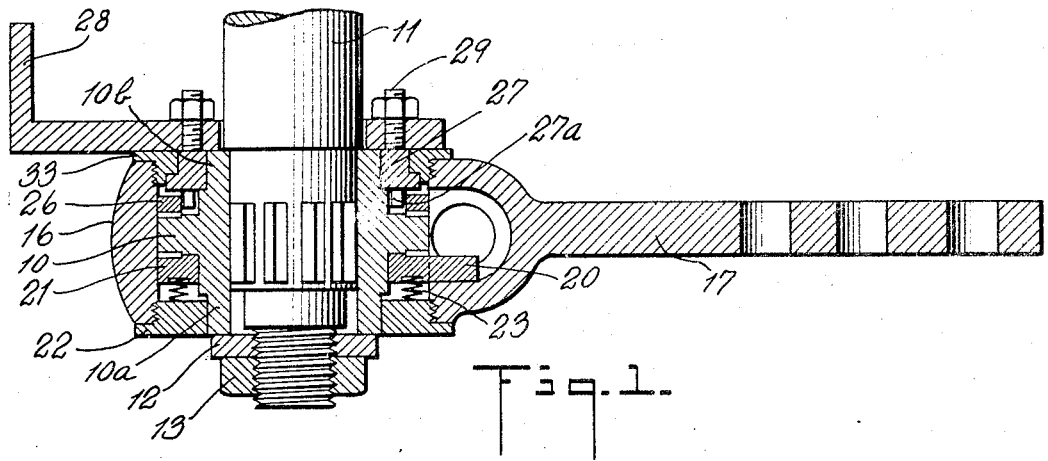
Fig. 1 is an axial section through a cam shaft operating and adjusting device.

In the application of Leon T. Freeman and Roy H. Shively, Serial No. 460,336, filed October 1, 1942, Patent 2,379,796, July 3, 1945, there is disclosed an automatic brake adjustment device in which the operating and adjustment pawls are mounted around the circumference of a ratchet gear.

In the application of Leon T. Freeman and Roy H. Shively, Serial No. 496,292, filed July 27, 1943, there is disclosed a brake adjusting device in which the operating and adjustment pawls are mounted adjacent the axial ends of the ratchet gear, and if desired auxiliary pawls around the circumference also, as for heavy duty work.

The present invention resembles the device of the latter application but is altered to provide a casing which is rigidly secured to the operating arm and also interior adjustment pawl anchorage means which is connected with a fixed external part.

The standard equipment of many vehicle wheel brakes includes a brake drum and cover, brake shoes, shoe spreaders such as cams, shoe contracters such as springs, a cam shaft, a shaft operating arm, an arm operating rod, and means such as a hand lever or power device for operating the rod. These details are well known and need not be particularly illustrated.

The present device comprises a ratchet gear 10 which is secured on the splined cam shaft 11. The gear is secured on the shaft by a washer 12 and a nut 13.

Surrounding the shaft and gear there is a casing 16 carrying an operating arm 17. The outer end of the arm is connected, as usual, to the brake operating rod, not shown. The arm has a turning movement about and upon the shaft.

Secured to the casing interiorly, as by a projection 20 and socket connection, an operating pawl plate 21 has end teeth which coact with the teeth on one end of the ratchet gear. This plate is shown separately in Fig. 7. A closure plate 22 is fixed to the end of the casing as by being threaded thereto or secured by screws, bolts, or the like. It has a turning fit interiorly upon the hub 10a of the gear 10 and may be provided with packing at the joint if desired, though none is shown. A plurality of springs 23 are disposed in sockets between the pawl plate 21 and the closure plate 22 to press the pawl plate teeth against the ratchet gear teeth but sufficient end movement is provided to permit the teeth to ride over each other to make adjustments.

Figure 5:
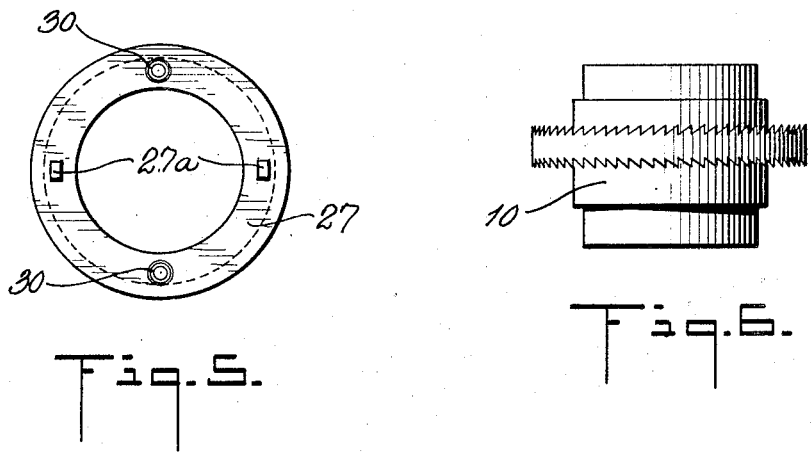
Fig. 5 is a flat view of an anchor ring.
Figure 6:
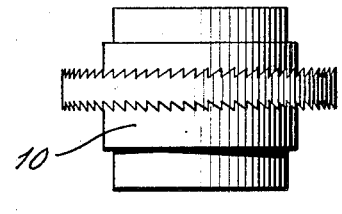
Fig. 6 is a side view of a ratchet gear.
Figure 2:
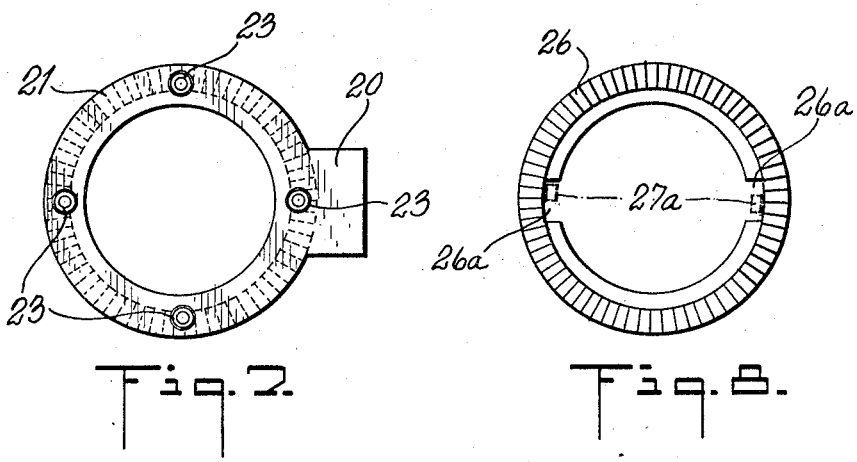
Fig. 2 is an end elevation.

An adjustment pawl plate 26 cooperates with the teeth on the other end of the ratchet gear 10. The adjustment pawl has a turning fit on the hub 10b of the ratchet gear. It is shown separately in Fig. 8. It is provided with circumferentially over-length slots 26a adapted to be engaged by pins 27a carried by a fixed ring 27, shown separately in Fig. 5. The ring is secured by a bracket 28 to any convenient fixed support, studs 29 securing the ring 27 to the annular portion of the bracket.

Figure 8:
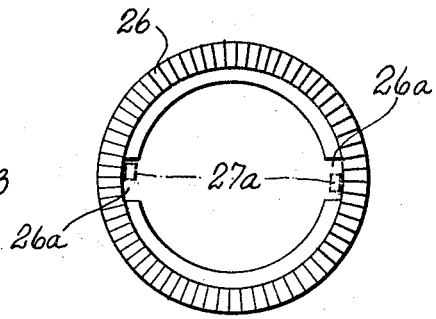
Fig. 8 is a flat view of an adjustment pawl.
Figure 2:
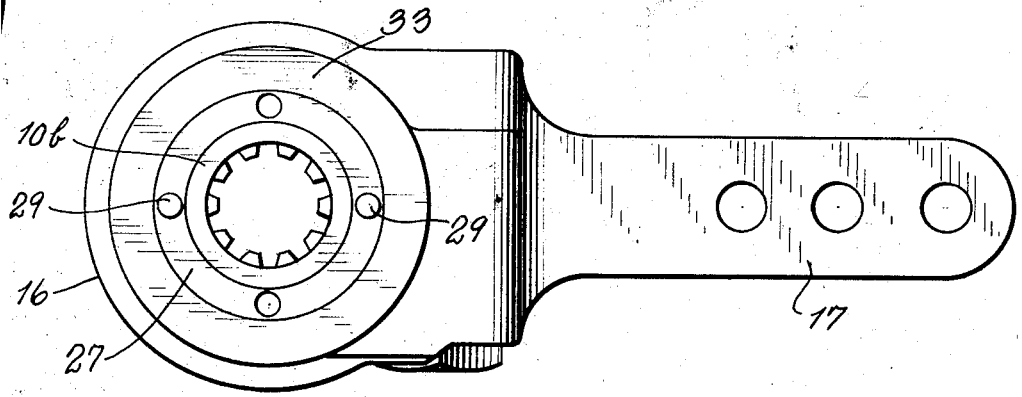
Figure 3:
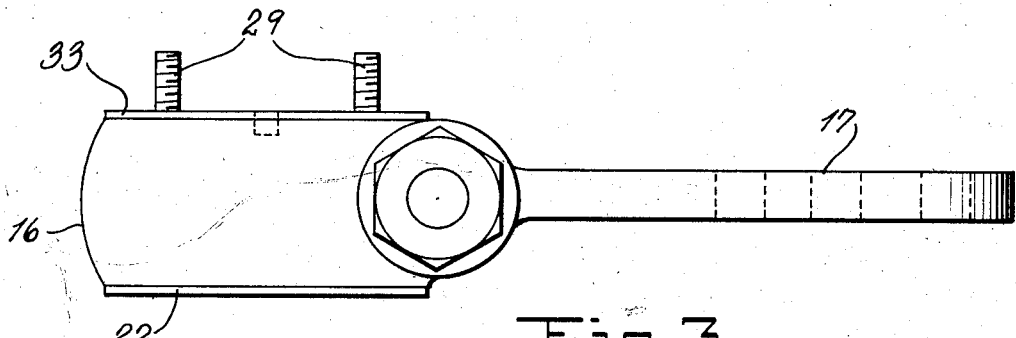
Fig. 3 is a side elevation.
Figure 4:
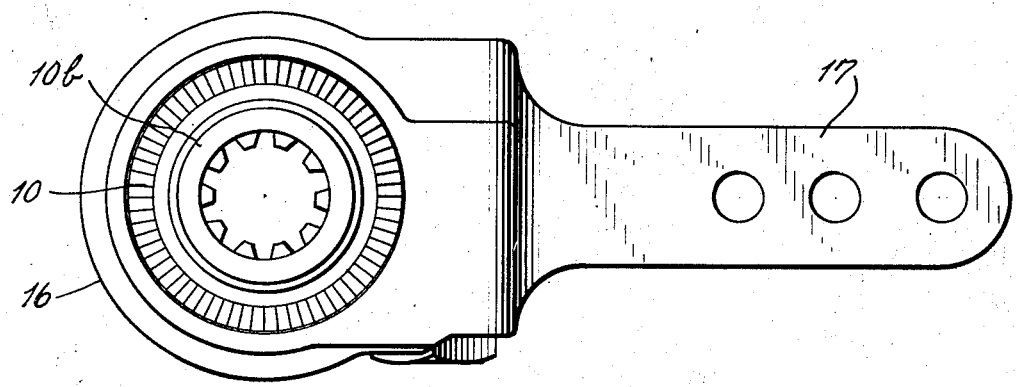
Fig. 4 is an end elevation with parts removed.

The pins 27a are shown in chain lines in Fig. 8 to illustrate the loose motion they have in the slots 26a. The movement is enough to permit release of the brakes after each take-up adjustment. A plurality of springs 30 disposed in sockets between the adjustment pawl plate 26 and the fixed ring 27 press the teeth of the plate against the teeth of the ratchet gear.

Sufficient axial play is provided for the teeth to ride over each other in making an adjustment.

The fixed ring 27 and with it the plate 26 are retained in proper position in the casing by a closure plate 33 which is threaded or otherwise rigidly secured to the casing. The interior of the closure plate 33 has a turning fit upon the fixed ring 27; and the hub 10b of the ratchet gear 10 has a turning fit within the fixed ring 27.

When the arm 17 is turned it carries with it the casing 16 and the operating pawl 20 thereby turning the ratchet gear 10 and the cam shaft 11 to operate the brakes. When the arm turns back the brakes are released. During the forward movement the adjustment pawl 26 follows the gear part way, due to spring pressure and permissible play of its slots 26a on the pins 27a, and slides on the ratchet gear teeth during the rest of the gear travel. When the gear moves back it pushes the adjustment pawl back. When, however, the brakes become worn enough to require an extra long throw of the arm the teeth of the adjustment pawl ride over the tops of the gear teeth and engage one tooth space further along. Then the gear will not return as far as before but only enough to release the brakes, and the operating pawl in returning rides over a gear tooth to take a new setting upon the ratchet gear. This automatic adjusting action is repeated from time to time until the brake bands need replacement. A scale and pointer may readily be provided between the casing or a fixed part and the cam shaft to indicate readily to an inspector when the brakes need relining.

The casing is shown to be formed with a bore for a hand adjustment worm screw to cooperate with a worm gear which replaces the ratchet gear 10 whereby the automatic adjusting means may be replaced by hand adjusting means if desired.

It is clear that the parts may be reversed relative to the ends of the casing for right or left hand wheels.

While one embodiment has been described for purposes of illustration it is to be understood that the invention may have various embodiments within the limits of the prior art and the scope of the subjoined claims.

We claim:

1. Brake operating mechanism comprising in combination, a cam operating shaft, an axially fixed ratchet gear secured on said shaft, said gear having ratchet teeth on each end, an axially fixed casing surrounding said shaft and gear, an operating arm secured to said casing, an axially slidable annular operating pawl mounted to turn about said shaft axis and having teeth cooperating with the teeth on one end of said gear, a closure plate removably secured to one end of and forming part of said casing, springs between said closure plate and said operating pawl for pressing the pawl teeth against the ratchet gear teeth, an axially slidable annular adjustment pawl mounted to turn about said shaft axis and having teeth cooperating with the teeth on the other end of said gear, an axially and circumferentially fixed annular plate secured adjacent said adjustment pawl, springs between said fixed plate and said adjustment pawl for pressing the pawl teeth against the gear teeth, a loose motion holding connection between said adjustment pawl and said fixed plate to prevent locking the brakes when operated, and an annular closure plate forming part of and securing said casing on said fixed plate, said arm and the casing with its end plates forming an enclosure about said gear and pawls.

2. Brake operating mechanism comprising in combination, a cam operating shaft, a ratchet gear secured on said shaft, said ratchet gear having teeth on each end face, an operating arm having bifurcated inner ends turnable about the axis of said shaft and ratchet gear, said ends being joined to form a turnable casing around said gear and related parts, an operating ring pawl and an adjustment ring pawl disposed between the opposite ends of said ratchet gear and the inner ends of said arm, end closure plates removably secured to said arm-formed casing retaining said ring pawls in position, springs between said ring pawls and said arm ends as comprising said end closure plates, a fixed annular ring between said adjustment ring pawl and the closure plate at that end, a loose motion connection between said adjustment pawl and fixed ring to prevent locking the brakes when operated, and means securing said operating pawl to move with said arm.

3. Brake operating mechanism comprising in combination, a cam operating shaft, an axially fixed ratchet gear secured on said shaft, said ratchet gear having ratchet teeth on each end face, an operating arm turnable about the axis of said shaft and gear, an axially slidable operating pawl and an axially slidable adjustment pawl having teeth for cooperating with the teeth on said ratchet gear, means urging the teeth of said pawls against the ratchet gear teeth, means connecting said operating pawl for movement with said arm, a circumferentially and axially fixed element, and means connecting the adjustment pawl with circumferential loose motion to the fixed element, said fixed element including an annular ring adjacent to but normally axially spaced from said adjustment pawl and a bracket detachably secured to the fixed element, and said operating arm carrying a casing surrounding said gear and pawls on the sides and ends, one end portion of the casing being disposed between the detachable bracket and the fixed element ring, said arm and its casing forming an enclosure about said gear and pawls.

4. Brake operating mechanism comprising in combination, a cam operating shaft, an axially fixed ratchet gear secured on said shaft, said ratchet gear having ratchet teeth on each end face, an axially slidable operating pawl cooperating with the ratchet teeth on one end face and an axially slidable adjustment pawl cooperating with the ratchet teeth on the other end face, an operating arm, an axially fixed casing on said arm enclosing said gear and pawls, means in said casing urging said pawls against said gear teeth, a circumferentially and axially fixed element entering said casing with a turning fit, removable means on the casing for retaining said fixed element in the casing, means connecting said adjustment pawl with loose motion to said fixed element, an interconnecting means between said operating pawl and said arm.

5. Apparatus as set forth in claim 4, further characterized by the fact that said casing includes removable end closure plates securing said enclosed parts therein and permitting their removal therefrom.

6. Brake operating mechanism comprising in combination, a cam operating shaft, a ratchet gear secured on said shaft, an operating arm and a casing secured thereon which is fully enclosed around said cam shaft and ratchet gear except for an annular opening in one end, said ratchet gear having hubs at each end extending out of the casing around said cam shaft, an operating pawl in said casing between the casing and the ratchet gear, a removable annular ring forming part of the casing at one end having a turning fit on the ratchet gear hub at that end, a fixed annular member extending into the annular opening of said casing around the ratchet gear hub at the other end, a removable annular ring forming part of the casing at the second end having a turning and retaining fit with said fixed annular part, and an adjustment pawl in said casing between said fixed part and said ratchet gear.

7. Brake operating mechanism comprising in combination, an operating arm including an annular shell and removable end plates forming a casing, a ratchet gear within the casing, said gear including hubs extending through the ends of the casing, a brake-operating cam shaft and means securing the ratchet gear to the cam shaft, the casing leaving an annular opening around a hub at one end, a fixed member extending into the annular opening and retained by the removable casing plate at that end, an anchorage and means removably securing said fixed member to said anchorage, an operating pawl within said casing connected to move with the casing, and an adjustment pawl within the casing connected with restricted play to said fixed member, both pawls cooperatively acting with said ratchet gear to operate and automatically adjust the cam shaft.

LEON T. FREEMAN.
ROY H. SHIVELY.